United States Patent [19]

Sheldrick

[11] 4,444,945

[45] Apr. 24, 1984

[54] LOW-SALT CONTAINING AQUEOUS SOLUTIONS OF MELAMINE-FORMALDEHYDE RESIN

[75] Inventor: George E. Sheldrick, North Oxford, Mass.

[73] Assignee: Monsanto Company, St. Louis, Mo.

[21] Appl. No.: 466,748

[22] Filed: Feb. 15, 1983

[51] Int. Cl.$^3$ .............................................. C08L 61/32
[52] U.S. Cl. .................................... 524/843; 106/90; 106/97; 524/598; 528/254
[58] Field of Search .................. 524/598, 843; 106/90; 528/254, 265

[56] References Cited

U.S. PATENT DOCUMENTS 3,941,734  3/1976  Aignesberger et al. ....... 260/29.4 R
3,985,696  10/1976  Aignesberger et al. ....... 260/29.4 R

FOREIGN PATENT DOCUMENTS

48215/79  11/1982  Australia .

*Primary Examiner*—Theodore E. Pertilla
*Attorney, Agent, or Firm*—R. Bruce Blance; William J. Farrington; Paul D. Matukaitis

[57] ABSTRACT

Low-salt containing aqueous solutions of melamine formaldehyde condensation products having anionic sulfo groups are prepared in a two stage process. In the first stage melamine, formaldehyde, and bisulfite are condensed in an aqueous solution at atmospheric reflux and pH 8–10 for 1–5 hours. In the second stage, condensation is continued at pH 6–7 and atmospheric reflux for 2–6 hours. The product is cooled and adjusted to pH 7–9.

5 Claims, No Drawings

LOW-SALT CONTAINING AQUEOUS SOLUTIONS OF MELAMINE-FORMALDEHYDE RESIN

This application is directed to a process for preparing aqueous sulfonated melamine/formaldehyde resins with a reduced level of salt content. The product is used in Portland cement to improve slump of the aqueous paste, to reduce water content of the paste and improve the mechanical properties of the hardened concrete.

The preparation of sulfonated melamine-formaldehyde resins disclosed in U.S. Pat. Nos. 2,730,516, 3,941,734 and 3,985,696 has usually been carried out in several steps including an acidification to low pH to accomplish condensation to high molecular weight. This acidification has several drawbacks. First, condensation at low pH is extremely rapid and must be controlled by maintaining low temperatures and low resin solids in the reaction mixture. High reaction solids can lead to gelation of the resin, or, at least, to processes that are difficult to control. Secondly, strong acidification results in the formation of considerable amounts of inorganic salt when the resin is neutralized. Such salt may account for 10% or more of the total resin solids and is difficult to remove, requiring precipitation and filtration or dialysis procedures. A large amount of salt, if left in the resin, can have undesirable effects when the resin is used. For example, it is well known that salts of various kinds can alter the hydration reaction of Portland cement even when present in low concentrations and reduce the mechanical properties of concrete preparations thereof.

I have discovered a process which produces a sulfonate melamine/formaldehyde resin free of the above discussed disadvantages.

The condensation products of the invention are employed for improving the properties of aqueous cement pastes which solidify to form concrete and for improving the properties of the solidified concrete. Thus, the solution products of the invention are employed to advantage in repairing defects in concrete, as liquefiers in concrete mixtures, in adhesive compositions for ceramic particles or glass, in the manufacture of cementitious floor tiles and of concrete blocks, and in the stabilization of soil and other geological strata.

It is also well known that decreased water to cement ratios yield cured concretes of improved strength. The sulfonated melamine-formaldehyde resins produced by this invention provide increased slump in cementitious pastes. Slump is a measure of the workability of fresh concrete. For a given slump, concrete can be formulated with significantly less water. In addition, for a given water to cement ratio, it is often desirable to have greater slump or improved fluidity so that concrete may be placed more easily in forms or around reinforcing bars. High slump concretes can be placed with less mechanical vibration and usually with reduced manpower requirements.

When employed for improving the compressive strength and other properties of structures prepared from mixtures of water, a cementitious material, and an inert filler, the condensate solution products of the invention are used in amounts of 0.1 to 5%, based on the weight of the solids of the sulfonated melamine/formaldehyde resin and the weight of the cementitious material in the mixture.

In the practice of the invention, aqueous formaldehyde and sodium bisulfite in a molar ratio of 2.0–3.0 to 1.0 are charged to a suitable reactor and mixed until the bisulfite is dissolved. The pH is adjusted to 8–10, preferably about 9.0, and melamine is charged in a molar ratio of about 1.0 mole per 0.8 to 1.2 mole of bisulfite. The reaction mixture is then heated to reflux at atmospheric pressure for a period of time up to 5 hours. The batch is cooled to below 90° C., preferably 50° to 70° C. and the pH is adjusted to 6–7, preferably about 6, with dilute acid. Reflux is resumed for about 2 to 6 hours, the batch is cooled, and the pH is adjusted to 7–9. The total resin solids is controlled by the concentration of the aqueous formaldehyde used and by the amount of water used to dilute the acid.

As already indicated, the molar ratios of the reactants, primarily formaldehyde and melamine, and the reaction solids are important factors in the successful preparation of desirable resins. It has been found that not all molar ratios of formaldehyde to melaine can be used within the total solids range of 20 to 45%. In general, resins from the higher molar ratios of formaldehyde to melamine are best prepared at lower reaction solids,, while resins with lower molar ratios may be prepared at higher solids.

To illustrate this important molar ratio/solids relationship, several resins were prepared according to the process in the above outline. All were reacted at pH 9.1 for four hours prior to pH adjustment to 6–7 by the introduction of dilute sulfuric acid. Reflux at atmospheric pressure was then continued, with the results shown in the table.

TABLE I

| | | VARYING MOLAR RATIOS | | | |
|---|---|---|---|---|---|
| | | | REACTION TIME | | |
| F/M/S[a] | REACTION pH | REACTION SOLIDS | hrs. | mins. | VISCOSITY[b] |
| 3/1/1 | 6.1 | 21.5% | 4 | 0 | 50 Pa.s, clear solution |
| 3/1/1 | 6.1 | 29.9 | 4 | 0 | 110 Pa.s, clear solution |
| 3/1/1 | 6.1 | 35.0 | 4 | 0 | 1300 Pa.s, some gel present |
| 3/1/1 | 6.1 | 40.0 | 0 | 5 | gelled |
| 2.5/1/1 | 6.1 | 35.0 | 4 | 0 | 540 Pa.s, clear solution |
| 2.5/1/1 | 6.1 | 40.0 | 0 | 25 | gelled |
| 2/1/1 | 6.4 | 46.2 | 4 | 0 | 925 Pa.s, clear yellow solution |

[a]Molar ratio of formaldehyde to melamine to bisulfite.
[b]Brookfield LVT at 25° C., #1 spindle, 60 rpm (samples above 100 cps run at 12 rpm). Resin pH adjusted to 8.2 to 8.6 before testing viscosity.

The following examples are presented to illustrate the invention and should not be construed as limitations thereof. Parts and percentages are by weight unless otherwise indicated.

EXAMPLE 1

A reaction kettle was fitted with an anchor agitator, thermometer, and condenser and means for heating and cooling. In a separate stirred vessel, 240 parts of 50% aqueous formaldehyde were added to a solution of 138 parts of sodium bisulfite in 600 parts of water. The pH of this mixture, as measured by glass electrode, was adjusted to 9.1 by the dropwise addition of 20% aqueous sodium hydroxide. The adjusted mixture was charged to the reaction kettle and 168 parts of melamine were added, forming a milky white suspension. Upon heating, the batch became clear at about 80° C. Heating was continued until reaching reflux at 103° C. at atmospheric pressure. The batch was then refluxed for 3 hours. After reflux the batch was cooled to 75° C. and 260 parts of water were added followed by 365 parts of dilute (1½% by weight) sulfuric acid. The pH of the batch was adjusted to 6.1 with about 1 part of 20% sodium hydroxide. The batch was again heated to atmospheric reflux at 102° C. for four hours. Upon cooling and adjusting the pH to 8.6 with dilute sodium hydroxide, the batch was found to contain 22.1% resin solids as measured by drying a small sample in an oven at 150° C. for one hour. The solids were then adjusted to 20% by the addition of water. The finished resin was a clear water-dilutable liquid having a viscosity of 45 pascal-seconds at 25° C. This resin was designated as Resin A in subsequent examples.

EXAMPLE 2

To the reaction kettle described in Example 1 was charged a solution consisting of 300 parts of 50% aqueous formaldehyde, 300 parts of water, 260 parts of sodium bisulfite, and sufficient 20% sodium hydroxide to provide a pH of 9.1. To this solution was added 315 parts of melamine. The batch was heated to atmospheric reflux at 105° C. After one hour, the batch cleared and there was no evidence of undissolved melamine. Reflux was continued for an additional 30 minutes. The batch was then cooled to 50° C. and a solution consisting of 16.2 parts of concentrated sulfuric acid in 478 parts of water was added. The pH of the batch was 6.0. The batch was then heated to reflux at 103° C. for four hours. Upon cooling, the resin was found to contain 40.9% resin solids. The pH of the batch was then adjusted to 8.6 with 20% sodium hydroxide, and the solids were adjusted to 20% by addition of water. The finished resin was dilutable with water in all proportions and had a viscosity of 45 pascal-seconds at 25° C. The resin was designated as Resin B.

EXAMPLE 3

A sulfonated melamine/formaldehyde resin was prepared according to the teachings of U.S. Pat. No. 3,985,696, Example 1. The product contained 34.2% resin solids and had a viscosity of 24.5 centipoises at 20° C. When diluted with water to 20% solids, the resin had a viscosity of 60 pascal-seconds at 20° C. This diluted resin was designated at Resin C in subsequent examples.

EXAMPLE 4

Ion chromatography was utilized to determine the sulfate content of Resins A, B, and C. The instrument used was a Dionex Model 10 Ion Chromatograph equipped with both a Dionex anion separation column and a suppression column to eliminate background signals. The eluent used was a dilute solution of sodium bicarbonate and sodium carbonate in water. Sulfate content was quantitatively determined by means of a conductivity detector. The detector was calibrated with solutions of known sulfate concentration.

TABLE II

| SALT CONTENT OF RESINS | | | |
|---|---|---|---|
| | Resin A | Resin B | Resin C |
| Measured $SO_4^=$, percent by weight | 0.92 | 1.08 | 2.95 |
| $SO_4$ as percent of resin solids | 4.6 | 5.4 | 14.8 |
| Equivalent $Na_2SO_4$ as percent of resin solids (calculated) | 6.8 | 8.0 | 21.8 |

The results of sulfate content determinations are shown in Table II. The $Na_2SO_4$ content of comparative example 3, Resin C was substantially higher than the $Na_2SO_4$ contents of Resins A and B prepared by the practice of the present invention.

EXAMPLE 5

Concrete mixtures were prepared from the following proportions of materials:

MIXTURE PROPORTIONS

Type I Portland Cement, parts: 705
Sand, parts: 1200
⅜" Gravel, parts: 1260
⅜" Gravel, parts: 540
Water/Cement ratio: 0.40
Total Water, parts: 323.0

The water/cement ratio is the weight of water added as a fraction of the weight of Portland cement employed. Total water includes this added water and also the moisture present in the various aggregates. Each batch was tested for fluidity or slump according to ASTM Standard C 143, "Test for Slump of Portland Cement Concrete". To each batch was added 1.43 parts per each 100 parts of Portland cement of the indicated sulfonated polymer. The slump was again measured. A further addition of the polymer was made, sufficient to bring the total dosage to 2.15 parts per 100 parts of Portland cement, and another slump measurement was made.

TABLE III

| | SLUMP DATA | | | | | |
|---|---|---|---|---|---|---|
| RESIN | A | A | B | B | C | C |
| Initial Slump, cm | 5 | 5 | 4 | 4 | 4 | 4 |
| Dosage, parts/parts cement | 1.43 | 2.15 | 1.43 | 2.15 | 1.43 | 2.15 |
| Slump with Resin, cm | 21 | 24 | 20 | 24 | 12 | 20 |

The results of the slump test (Table III) show that the (Resins A and B) prepared by the process of the invention provided improved slump properties at low doses over Resin C of comparative example 3. At a dose of 1.43 parts, Resin A and B provide slump of 21 and 20 cm, respectively, and Resin C provided a slump of 12 cm. Therefore the invention teaches an improved resin with better slump properties. The slump at higher doses (2.15 parts) is also improved with Resin A and B, but the results are not as dramatic.

What is claimed is:
1. A process for preparing a solution of resinous products containing sulfonate groups, which comprises:
(a) dissolving sodium bisulfite in formaldehyde and water such that the formaldehyde to sodium bisulfite mole ratio is 2-3 to 1,

(b) adjusting the pH to 8 to 10,
(c) adding melamine such that the mole ratio of melamine to sodium bisulfite is 1 to 0.8–1.2,
(d) heating to atmospheric reflux for 1 to 5 hours,
(e) cooling the mixture to below 90° C.,
(f) adjusting the pH to 6 to 7,
(g) heating to atmospheric reflux for 2 to 6 hours,
(h) cooling the solution and
(i) adjusting the pH to 7 to 9.

2. The process as set forth in claim 1 wherein the pH of step b is about 9.

3. The process as set forth in claim 1 wherein the pH of step f is about 6.

4. A method of improving the slump of a paste comprising water, a cementitious material capable of causing solidification of the paste by reaction with the water, and an inert, solid filler, which comprises adding to the paste the solution prepared by the process set forth in claim 1 in an amount of 0.1 to 5.0% based on the weight of the solids of the resinous products and the weight of the cementitious material.

5. The method as set forth in claim 4 wherein said cementitious material is Portland cement.

* * * * *